April 21, 1936.  W. C. STARKEY  2,038,063

OVERRUNNING CLUTCH

Filed March 27, 1933

Inventor:
William C. Starkey,
By Arthur W. Wilson
Atty.

Patented Apr. 21, 1936

2,038,063

UNITED STATES PATENT OFFICE 2,038,063

OVERRUNNING CLUTCH

William C. Starkey, Indianapolis, Ind., assignor, by mesne assignments, to William C. Starkey, Raymond S. Pruitt, and Walter H. Beal, trustees Application March 27, 1933, Serial No. 662,883

6 Claims. (Cl. 192—41)

This invention relates to improvements in overrunning clutches, and it consists of the matters hereinafter described and more particularly pointed out in the appended claims.

The clutch with which the invention is more particularly concerned is of the kind employing a helical spring having a flexible energizing portion, as the element operable in response to relative rotation of the coacting clutch members in one direction to clutch said members together.

In overrunning clutches of this kind wherein the spring includes a more flexible energizing portion at one end, several factors are present which permit the energizing portion of the spring to slip in the initial part of its function. Such factors may be slippery clutch surfaces, thinning of the lubricant and other changes in functional conditions in the clutch.

One of the objects of the present invention is to provide a clutch of this kind wherein one of the friction surfaces and the energizing portion of the spring are so formed as to coact in providing immediate positive energizing action of said energizing portion of the spring in response to relative rotation of the coacting clutch members in one direction, thus eliminating the factors above mentioned which tend to prevent such immediate action.

Another object of the invention is so to construct a part of the friction surface of one of the clutch members and the associated part of the energizing portion of the spring, that the number of turns in the energizing portion may be materially reduced in number. In this manner, a reduction in the overall length of the clutch is possible without a reduction of the area of the frictional surface of the spring or the area of said clutching surface of the spring may be increased without increasing overall length of the clutch.

Another object of the invention is to form a part of the gripping surface of the clutch and the associated part of the energizing portion of the spring with quite fine ratchet teeth which in response to relative rotation of the clutch members in one direction, immediately engage to start spring energization and thus hold said energizing portion against the slightest initial slip.

The above mentioned objects of the invention, as well as others, together with the many advantages thereof will more fully appear from a consideration of the following detailed specification.

Figure 1:
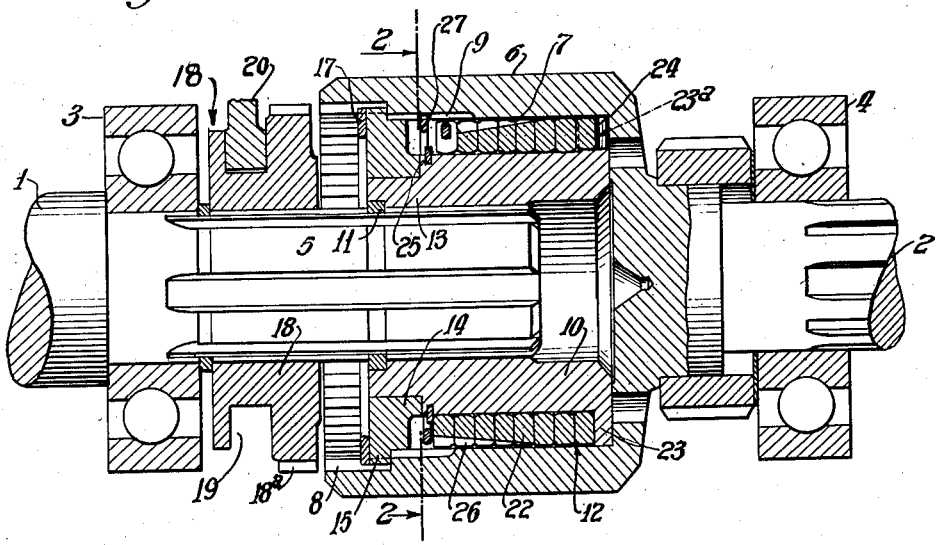
Fig. 1 is a longitudinal vertical sectional view through an overrunning clutch embodying the invention.
Figure 2:
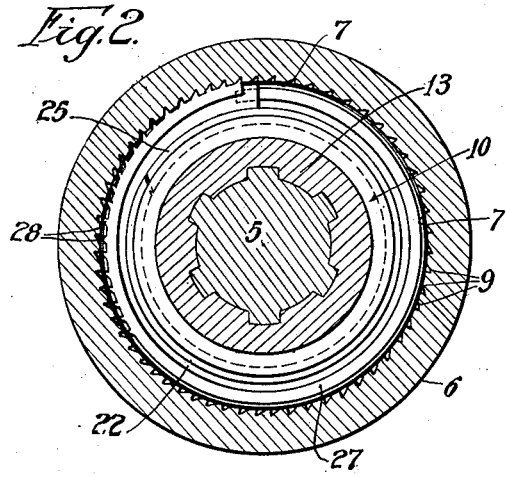
Fig. 2 is a transverse vertical section taken on the line 2—2 of Fig. 1.
Figure 3:
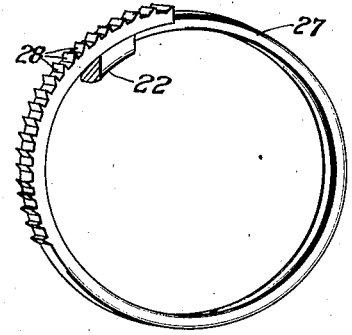
Fig. 3 is a perspective view of the energizing end of the clutch spring.

The overrunning spring clutch which forms the subject matter of the invention is generally known as a "single pocket spring clutch".

In general, the clutch comprises two clutch members and a clutch spring which in response to relative rotation of said clutch members in one direction operates to clutch the members together for conjoint rotation. The clutch spring includes a more flexible energizing portion which gives sensitivity to the clutching action of the spring. As shown herein, said energizing portion is made as substantially a complete turn of spring stock, of a cross sectional area smaller than that of the gripping or load carrying part of the spring. To reduce slipping of the energizing portion of the spring to the smallest degree, if not entirely eliminating the same, there is formed in a part of said energizing portion of the spring, ratchet teeth that cooperate with associated teeth or grooves in the clutch surface of one of the clutch parts to cause a positive connection between the two to start energizing action of the spring. These teeth, which are quite fine, operate in response to relative rotation of the clutch members in one direction immediately to connect the energizing portion of the spring to one of said clutch members. Said teeth also operate in response to relative rotation of the clutch members in the other direction to ratchet and permit overrunning between said clutch members. Because the teeth are relatively fine and the clutch is ordinarily packed with a lubricant, no noise or clicking is perceptible in the overrunning action.

Referring now in detail to the clutch, illustrated in the accompanying drawing:

1 indicates the driving shaft of the clutch and 2 indicates the coaxial driven shaft thereof. When the clutch is employed as a free wheeling unit in connection with an automobile transmission, then said shaft 1 constitutes the main driven shaft of the transmission and the shaft 2 constitutes the secondary driven shaft thereof, adapted for operative connection with an associated propeller shaft. The two shafts as herein shown are journalled respectively in suitable antifriction bearings 3 and 4.

The driving shaft 1 has a splined end 5 extending rearwardly beyond the bearing 3. The driven shaft 2 is formed on its front end with an integral, cup-like, clutch member 6 which overhangs or surrounds a portion of, but is spaced radially from the splined end of the driving shaft. Said cup-like clutch member 6 is formed with an internal, cylindrical clutch surface 7 which terminates short of the open front end of the clutch member. The front end of said clutch member is provided with integral spline teeth 8, the purpose of which will appear later. In the front end of the clutch surface 7 is formed a plurality of longitudinally extending, ratchet grooves 9. Each groove includes a substantially radial surface and a second surface arranged at an inclination or angle to said radial surface and said grooves are so arcuately spaced apart as to leave portions of the surface 7 between them.

10 indicates a sleeve splined upon the rear portion of the splined end 5 of the driving shaft. This sleeve is held in place with its rear end in substantial engagement with the rear end wall of the clutch member 6 by means of a locking ring 11 associated with the front end of the sleeve and engaged in an annular groove in said splined end 5 of the driving shaft. The sleeve 10 is of a diameter less than that of the clutch surface 7 and coacts therewith to define an annular clutch spring recess 12.

The front end of the sleeve 10 is reduced in diameter to provide a shouldered hub 13 upon which is mounted a bearing ring or bushing 14. This bushing has external spline teeth 15 at its front end that engage in the spaces between the teeth 8 on the front end of the clutch member 6. A spring locking ring 17 engaged in an internal annular groove provided therefor in the front end of the clutch member 6, holds said bushing against endwise displacement. It is apparent that with the above construction, the bushing or ring 14 turns with the clutch member 6 and provides a bearing for the front end thereof upon the sleeve 10.

Between the bearing 3 and the front end of the clutch member 6 and splined on the end 5 of the driving shaft, is a longitudinally shiftable, positive clutch collar 18. The rear end of said clutch collar has external spline teeth 18a to match those on the front end of the clutch member 6. In the front end of said collar is formed an annular groove 19 to receive a yoke 20 by means of which said collar may be longitudinally shifted into interlocked relation with the clutch member 6 in order to lock the two clutch members together for conjoint rotation in either direction.

Non-rotatively or fixedly mounted on the sleeve 10 is the main clutch spring 22 of the clutch. This spring is helical in form and is ground into true cylindrical shape to cooperate with the cylindrical clutch surface 7 in the cup-like clutch member 6. In its unstressed condition, the spring which is internally supported on said sleeve, has a slight clearance with respect to said surface 7.

Figure 4:
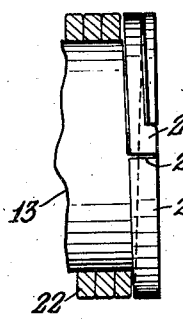
Fig. 4 is a view partly in elevation and partly in section showing the manner in which the clutch spring is operatively connected at one end thereof to one of the clutch members so as to rotate therewith.

On the rear end of the sleeve 10 is a radial flange 23 which is complete in continuity except for a gap or recess 23a in which a toe 24 on the associated end of the clutch spring extends as shown in Fig. 4. The toe and recess connection between the spring and the flange 23 serves to secure the spring to the sleeve 10 so that it is rotatable therewith. The front surface of this flange forms a substantially complete helix having a lead corresponding to that of the spring so that the last convolution thereof fits flatly against the surface. To prevent endwise movement of the clutch spring, a spring ring 25 is arranged in an annular groove in the front end of the sleeve 10.

To make the front end of the clutch spring more flexible in character, arcuately spaced, gradient grooves 26 are formed in the external surface of said end of the spring. These grooves are deepest at and open through the front end of the spring. It is to be noted with respect to said spring, that the ratchet grooves 9 in the surface 7 are of such length as to take in about two of the convolutions at the front end of the spring as best shown in Fig. 1.

Associated with the front end of the clutch spring is an energizing spring 27 which is made of smaller cross sectional and more flexible stock than the main spring. Heretofore, said energizing spring constituted a number of convolutions and was provided with a smooth plain gripping surface. By reason of the present invention, the number of convolutions has been reduced to substantially one complete convolution so that the overall length of the clutch is reduced accordingly.

The energizing spring has a normal diameter slightly greater than that of the main clutch spring so that a portion of its free end tends to hug the surface 7. The rear end of said energizing spring is anchored in the end face of the front convolution of the main clutch spring. The free front end portion of the energizing spring is provided on its external periphery with ratchet teeth 28, arcuately spaced in accordance with the ratchet grooves 9 in the front end of the clutch surface 7.

The operation of the clutch is as follows: When the driving shaft is rotating at a speed greater than that of the driven shaft and in the proper direction, the sleeve 10 will tend to carry the toed end of the spring with it. With the ratchet teeth 28 of the energizing spring engaged in certain of the ratchet grooves 9 in the clutch surface 7, this engagement will hold or anchor the associated end of the clutch spring so that said clutch spring is unwound and radially expanded into gripping engagement with the surface 7. Thus the toed end of the spring is placed under a compressive strain under the driving influence of the sleeve and this provides a positive connection between the spring and clutch member 6.

However, it is pointed out that as the toed end of the spring is completely surrounded on one side by the flange 23, on the other side by the next convolution of the spring, internally by the sleeve 10 and externally by the clutch member 6, it is amply reinforced or backed up against any flexing or movement tending to disrupt or fracture the same.

Should the driven shaft 2 and clutch member 6 tend to rotate at a speed greater than that of the driving shaft, the clutch member 6 through the energizing spring will act to wind up the clutch spring. This reduces the diameter of the clutch spring to again establish clearance between the clutch spring and clutch member so that the clutch member may overrun the driving shaft.

It is to be noted that the ratchet grooves are of a much greater axial length than the axial length of the teeth 28 on the energizing spring. This insures that these grooves will always be in the path of or in a position to be operatively engaged by the teeth of the energizing spring. When overrunning of the clutch starts, these teeth snap into and out of the grooves 9. When the relative rotation of the parts is reversed, all of said teeth again drop into the grooves, thus holding the energizing spring against even the slightest initial slip in the lock out direction, beyond the distance of one tooth.

Thus this construction presents a plurality or series of shouldered surfaces abutting each other between the clutch member 6 and the energizing spring to initiate energizing action. Such a construction, eliminates completely the factor or question of slippery surfaces, thin lubricant or any other change of functional conditions entering the clutch and which heretofore permitted slippage.

In practice only a small length of the free end portion of the spring contacts the surface 7 in the plane of the grooves and due to the resilience of the energizing spring, the remaining portion of the energizing spring winds down within the clutch surface 7 and does not touch the same. Therefore with about twenty of such teeth in the energizing spring, only the first four or five of them will wear at all. Should these first four or five of the teeth wear down after long use then the next succeeding teeth take up the intended action so that the period of usefulness of the spring is greatly prolonged. In this respect, if only one tooth were to function or shoulder, that would be sufficient to insure energizing action.

When it is desired to lock out the action of the clutch spring and provide a positive driving connection between the shafts 1 and 2, the clutch collar 18 is shifted toward and into the open front end of the clutch member 6. This movement of the clutch collar due to the splined construction before mentioned positively connects said shafts together. Such a lock out is of course desired when the driven and driving shafts are to be rotated in a reverse direction.

The gradient grooves in the clutch spring in connection with the ratchet grooves in the surface 7, coact to provide channels for movement of the lubricant with which the clutch is packed, under the squeezing action of the clutch spring when energizing. This also insures that a sufficient supply of lubricant will be present in the energizing end of the clutch so that in the overrunning action, the lubricant in the ratchet grooves 9 will act to cushion the movement of the teeth when ratcheting in and out of the grooves 9. With such a cushioning action by the lubricant, there will be no clicking noises developed in the clutch and the latter will be smooth and quiet in operation.

Another advantage afforded is that an energizing spring constituting but substantially one complete turn will suffice, instead of the four or five turns heretofore necessary. Thus the overall length of the clutch may be considerably reduced and the manufacturing costs correspondingly lessened.

While in describing the invention I have referred in detail to the form, arrangement and construction of the parts involved, the same is to be considered only as illustrative so that I do not wish to be limited thereto except as may be specifically set forth in the appended claims.

I claim as my invention:

1. An overrunning clutch embodying therein two relatively rotatable, complemental clutch members, a clutch spring having a portion operatively connected to one of said members so that it rotates therewith and also having an energizing portion of less thickness than the coils of the remaining portion of the spring, the other member having a surface arranged to be gripped by said spring upon a change in its diameter in one direction, and coacting grooves and rigid ratchet teeth between the energizing portion of the clutch spring and the portion of said other clutch member that defines the aforesaid surface whereby said energizing portion of the spring is positively connected to said other clutch member for clutch spring actuating purposes in response to relative rotation of the two clutch members in one direction.

2. An overrunning clutch embodying therein two relatively rotatable, complemental clutch members, a clutch spring having one end operatively connected to one of said members so that it rotates therewith, the other member having a surface arranged to be gripped by said spring upon a change in its diameter in one direction, there being an annular series of arcuately spaced ratchet grooves in said other clutch member, and an energizing spring connected to and forming a part of the other end of said clutch spring and having arcuately spaced teeth on a portion thereof arranged so that in response to relative rotation of the clutch members in one direction they interlock with said arcuately spaced grooves and coact with the latter positively to connect the energizing spring to said other clutch member for clutch spring actuating purposes.

3. An overrunning clutch embodying therein two relatively rotatable, complemental clutch members, a clutch spring having one end operatively connected to one of said members so that it rotates therewith, the other member having a peripheral surface arranged to be gripped by said spring upon a change in its diameter in one direction, there being an annular series of arcuately spaced ratchet grooves in said other clutch member, an energizing spring comprising substantially a complete convolution having a smaller cross sectional area than that of the clutch spring, connected to the other end of the clutch spring and being more resilient than the same, and teeth on a portion of said energizing spring arranged so that in response to relative rotation of the clutch members in one direction they interlock with said ratchet grooves and serve positively to connect the energizing spring to said other clutch member for clutch spring actuating purposes.

4. An overrunning clutch embodying therein two relatively rotatable, complemental clutch members, a clutch spring having one end operatively connected to one of said members so that it is rotatable therewith, the other member having a surface arranged to be gripped by said spring upon a change in its diameter in one direction, and also having an annular series of arcuately spaced ratchet grooves in said surface, and an energizing spring fixed to the other end of said clutch spring, said energizing spring being more flexible than the clutch spring and of a diameter slightly greater than that of said surface and having teeth on a portion thereof arranged so that in response to relative rotation of said members in one direction they interlock with the grooves and serve positively to connect the energizing spring to said other clutch member for clutch spring actuating purposes.

5. An overrunning clutch embodying therein two relatively rotatable, complemental clutch members, a clutch spring having one end operatively connected to one of said members so that it is rotatable therewith, the other member having an internal clutch surface arranged to be gripped by said spring when radially expanded, and also having an annular series of internal ratchet grooves, and an energizing spring secured at one end to the other end of said clutch spring having teeth on its other end arranged so that in response to relative rotation of the clutch members in one direction they interlock with said grooves and serve positively to connect the energizing spring to said other clutch member for clutch spring actuating purposes.

6. An overrunning clutch embodying therein two relatively rotatable, complemental clutch members, a clutch spring having a portion operatively connected to one of said members so that it rotates therewith, the other clutch member having an internal clutch surface arranged to be gripped by said spring when radially expanded, and also having an annular series of ratchet grooves in said surface, and an energizing spring secured at one end to the other end of the clutch spring and having teeth on the external periphery of a part of its other end arranged so that in response to relative rotation of said clutch members in one direction they interlock with said grooves and serve positively to connect the energizing spring to said other clutch member for clutch spring actuating purposes.

WILLIAM C. STARKEY.